US011201986B2

(12) United States Patent
Sato

(10) Patent No.: US 11,201,986 B2
(45) Date of Patent: Dec. 14, 2021

(54) PERIPHERAL APPARATUS HAVING AN AUTHENTICATION PROCESS TO GENERATE ELECTRONIC DATA

(71) Applicant: CANON KABUSHIKI KAISHA, Tokyo (JP)

(72) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/791,804

(22) Filed: Feb. 14, 2020

(65) Prior Publication Data

US 2020/0267281 A1 Aug. 20, 2020

(30) Foreign Application Priority Data

Feb. 20, 2019 (JP) ............................ JP2019-028395

(51) Int. Cl.
*H04N 1/44* (2006.01)

(52) U.S. Cl.
CPC ........... *H04N 1/4426* (2013.01); *H04N 1/442* (2013.01); *H04N 1/4433* (2013.01)

(58) Field of Classification Search
None
See application file for complete search history.

(56) References Cited

U.S. PATENT DOCUMENTS

2015/0288687 A1* 10/2015 Heshmati ............... G07C 9/257 726/7
2017/0017938 A1* 1/2017 Lee ...................... G06Q 20/321
2017/0371600 A1* 12/2017 Tanaka ............... H04N 1/00381
2020/0019352 A1* 1/2020 Agrawal .............. G06F 3/1268

FOREIGN PATENT DOCUMENTS

JP 2009-171309 A 7/2009

* cited by examiner

*Primary Examiner* — Lennin R RodriguezGonzalez
(74) *Attorney, Agent, or Firm* — Canon U.S.A., Inc. IP Division

(57) ABSTRACT

A peripheral apparatus is provided and includes a function of generating electronic data from an information medium. Upon detection of the information medium, the peripheral apparatus starts processing including generating the electronic data using information acquired from the detected information medium and transmitting the generated electronic data to a destination registered in association with a user of an authenticated wearable terminal within a predetermined range, based on communication with the authenticated wearable terminal.

17 Claims, 8 Drawing Sheets

PERIPHERAL APPARATUS HAVING AN AUTHENTICATION PROCESS TO GENERATE ELECTRONIC DATA

BACKGROUND

Field

The present disclosure relates to a technique that improves convenience of a user using a predetermined authentication method in using a peripheral apparatus.

Description of the Related Art

Many conventional peripheral apparatuses, such as image processing apparatuses and multi-function peripheral apparatuses (MFPs), employ authentication using a user-input password or authentication using a card by passing the card over a card reader. For example, in the technique discussed in Japanese Patent Application Laid-Open No. 2009-171309, after the authentication is completed, the image processing apparatus provides a button for transmitting scan image data to a pre-registered email address of the user as a destination. Some peripheral apparatuses authenticate a user by using biometric information, such as fingerprint authentication.

After authentication based on user input, peripheral apparatuses generate image data by scanning a document placed on a scanner and transmits the generated image data based on a user key operation.

SUMMARY

In a case where a peripheral apparatus is shared by a plurality of users, there arises a demand for minimizing the time each user needs to spend to operate the peripheral apparatus, such as an authentication operation and a key input operation. For example, in a case where the user using the peripheral apparatus wishes to transmit scan image data to a pre-registered email address of the user as a destination, there arises a demand for a system in which a conventional user operation can be skipped.

According to an aspect of the present disclosure, a peripheral apparatus configured to generate electronic data from an information medium includes at least one memory storing instructions and at least one processor executing the instructions causing the peripheral apparatus to acquire data containing information about an authentication state from a wearable terminal within a predetermined range, and in a case where the acquired data contains information that indicates an authenticated state and an information medium is detected by the peripheral apparatus, start processing including generating the electronic data using information acquired from the detected information medium and transmitting the generated electronic data to a destination registered in association with a user of the wearable terminal.

Further features of the present disclosure will become apparent from the following description of exemplary embodiments with reference to the attached drawings.

DESCRIPTION OF THE EMBODIMENTS

Exemplary embodiments will be described in detail below with reference to the drawings.

<System Configuration>

Figure 1:
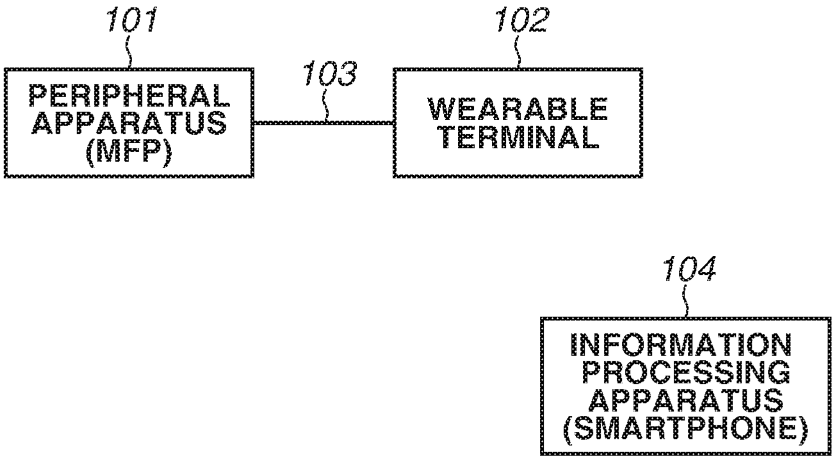
FIG. 1 is a schematic view illustrating an entire configuration of a system.

FIG. 1 is a schematic view illustrating an entire configuration of a system according to an exemplary embodiment.

The system mainly includes a multi-function peripheral (MFP) 101 and a wearable terminal 102. The MFP 101 is an example of a peripheral apparatus. There can be an information processing apparatus 104, such as a smartphone or tablet, of a user wearing the wearable terminal 102. The wearable terminal 102 and the information processing apparatus 104 wirelessly communicate with each other via Bluetooth® wireless communication. The information processing apparatus 104 includes a sensor configured to detect biometric information, such as a fingerprint or face image. The information processing apparatus 104 further includes an authentication function that uses data detected by the sensor.

The MFP 101 and the wearable terminal 102 are connected via a network 103. In the present exemplary embodiment, the network 103 is a network mainly for wireless short-range communication such as Bluetooth®) Low Energy or near-field communication (NFC).

Some wearable terminals include an authentication function using biometric information and a function of managing an external authentication state of a user currently wearing the terminal. Examples of such wearable terminals include a band-type wearable terminal that includes an electrocardiogram authentication function. The band-type wearable terminal includes a sensor attached to a clasp of the band, and once authentication using an electrocardiogram is conducted, the authenticated state is maintained until the band is unclasped. The present disclosure is applicable to the band-type wearable terminals that include the electrocardiogram authentication function and also various other wearable terminals that have a function of communicating with a peripheral apparatus, an authentication function, and/or an attachment state detection mechanism, such as an eyeglasses-type wearable terminal that performs iris authentication.

In the present exemplary embodiment, an example will be described below in which the wearable terminal 102 authenticates the user wearing the wearable terminal 102 using biometric information about the user to log the user in to the MFP 101. Then, if the user brings the wearable terminal 102 in a successfully-authenticated state near the MFP 101 and the wearable terminal 102 and the MFP 101 wirelessly communicate with each other, the MFP 101 executes a specific function using information about the logon user that is identified through the communication.

As a specific example, description will be given below of a case in which the MFP 101 starts automatic transmission of scan image data to a destination, such as address information about the logon user, that is identified when the wearable terminal 102 is brought near the MFP 101.

<Internal Configuration of Peripheral Apparatus>

Figure 2A:
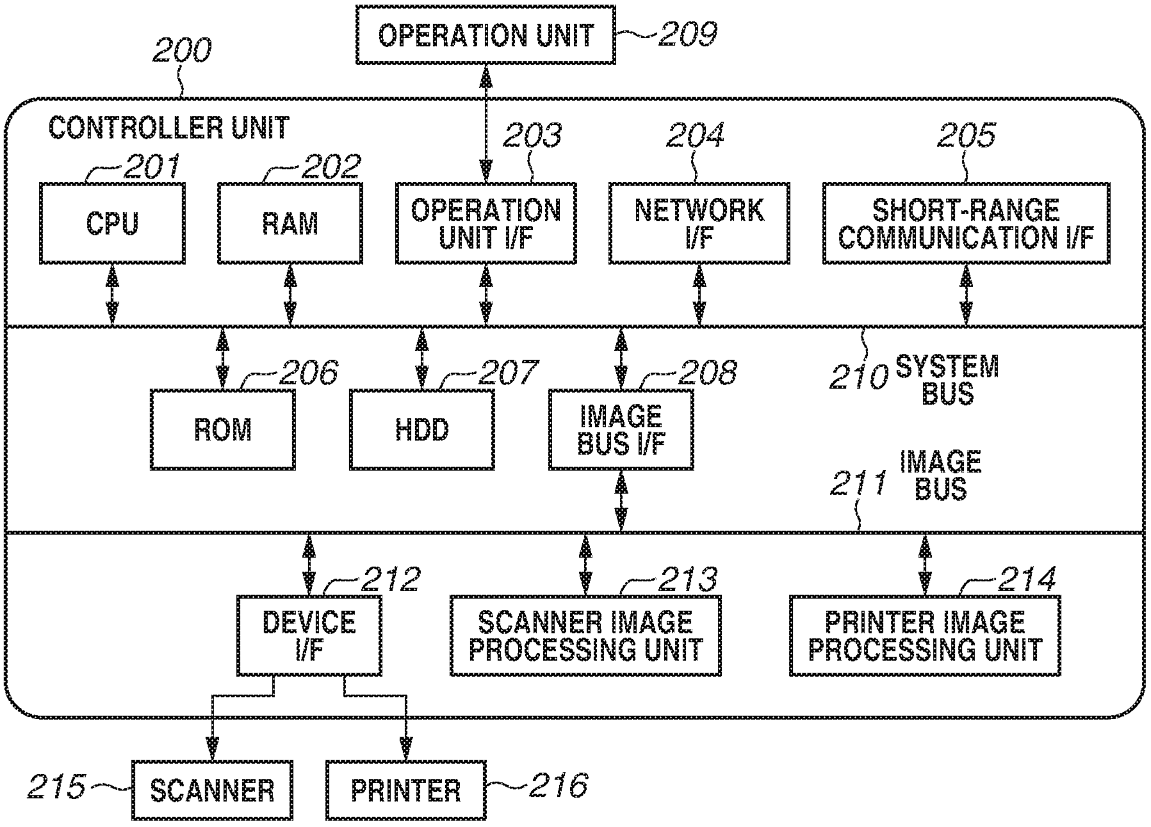
FIG. 2A is a block diagram illustrating an example of an internal configuration of a multi-function peripheral (MFP).

FIG. 2A illustrates an internal configuration of the MFP 101, which is an example of the peripheral apparatus.

The MFP 101 includes a controller unit 200. A scanner 215, a printer 216, and an operation unit 209 are connected to the controller unit 200. The scanner 215 is an image input device, and the printer 216 is an image output device. The controller unit 200 performs control to realize a transmission function by which image data read by the scanner 215 is transmitted via a network interface (network I/F) 204.

The controller unit 200 includes a central processing unit (CPU) 201, which is a processor. The CPU 201 activates an operating system (OS) using a boot program stored on a read-only memory (ROM) 206. The CPU 201 executes a program stored on the ROM 206 or a hard disk drive (HDD) 207 on the OS to thereby execute various types of processing. A random access memory (RAM) 202 is used as a work area of the CPU 201. The RAM 202 provides the work area as well as an image memory area for temporarily storing image data. The HDD 207 stores the program and image data. The ROM 206, the RAM 202, and an operation unit interface (operation unit I/F) 203 are connected to the CPU 201 via a system bus 210. Further, the network I/F 204 and an image bus interface (image bus I/F) 208 are connected to the CPU 201.

The operation unit I/F 203 is an interface between the controller unit 200 and the operation unit 209 including a touch panel. The operation unit I/F 203 outputs a user interface (UI) that is to be displayed on the operation unit 209 to the operation unit 209. The operation unit I/F 203 transmits information input by the user via the operation unit 209 to the CPU 201. The network I/F 204 is an interface via which the MFP 101 is connected to a local area network (LAN). The connection to the network via the network I/F 204 can be wired connection or wireless connection. A short-range communication I/F 205 is an interface that supports a communication method for short-range communication, such as Bluetooth® Low Energy, and via which the MFP 101 and an external apparatus, such as the wearable terminal 102, are connected.

The image bus I/F 208 is a bus bridge that connects the system bus 210 and an image bus 211, which transfers image data at high speed, and converts a data format. Examples of the image bus 211 include a peripheral component interconnect (PCI) bus and an Institute of Electrical and Electronics Engineers (IEEE) 1394 bus. A device I/F 212, a scanner image processing unit 213, and a printer image processing unit 214 are provided on the image bus 211. The scanner 215 and the printer 216 are connected to the device I/F 212, and the device I/F 212 performs synchronous/asynchronous conversion on image data. The scanner image processing unit 213 corrects, processes, and/or edits input image data. The printer image processing unit 214 performs correction and resolution conversion on printed output image data as needed for the printer 216. The scanner 215 performs document reading and document detection.

<Internal Configuration of Wearable Terminal>

Figure 2B:
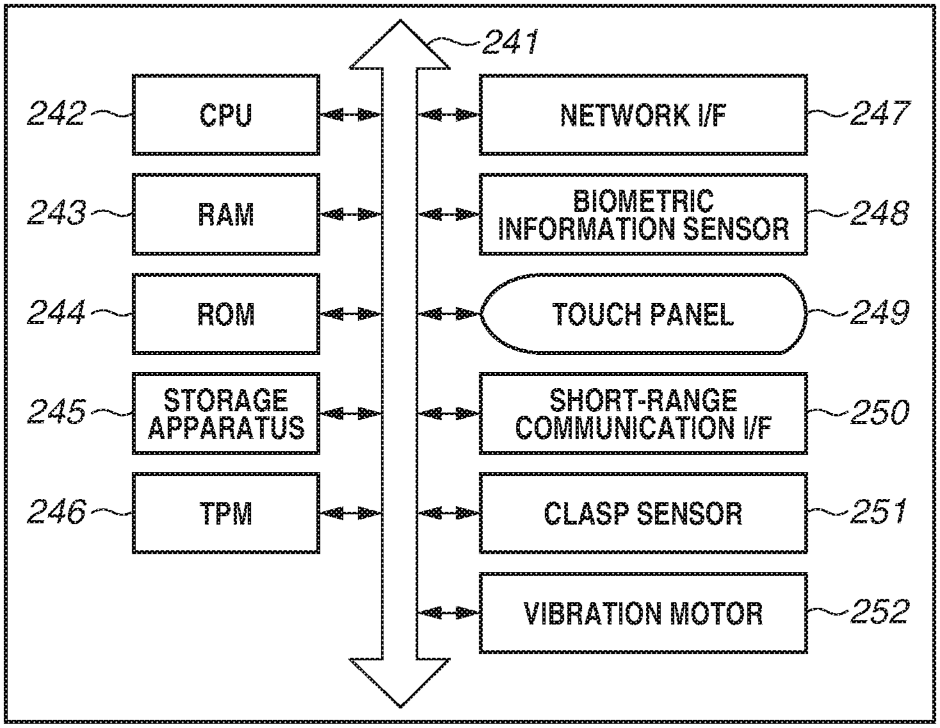
FIG. 2B is a block diagram illustrating an example of an internal configuration of a wearable terminal.

FIG. 2B illustrates an internal configuration of the wearable terminal 102.

A system bus 241 connects a CPU 242, a RAM 243, a ROM 244, a storage apparatus 245, a tamper module (TPM) 246, a network I/F 247, a biometric information sensor 248, a touch panel 249, a short-range communication IF 250, a clasp sensor 251, and a vibration motor 252 with one another. The CPU 242 reads a program (including a program configured to realize a process described below), such as an OS, stored on the ROM 244 or the storage apparatus 245 and executes various types of control processing. The RAM 243 functions as a memory and a work area of the CPU 242. The network I/F 247 one-directionally or bidirectionally exchanges data with an external network device using Wi-Fi®. The CPU 242 executes a program together with the RAM 243 and the ROM 244 and records data to a recording medium such as the storage apparatus 245.

The TPM 246 is an anti-tampering storage area that prevents external reading of stored data to process or store confidential information. In the present disclosure, biometric information for use in biometric authentication, a feature amount of the biometric information, or a private key corresponding to the biometric information is stored. Data that is necessary for biometric authentication processing, such as biometric information or a feature amount of the biometric information, and is stored on the TPM 246 will be referred to as "biometric information". The biometric information sensor 248 is a sensor configured to read biometric information about the user. For example, the biometric information sensor 248 reads information about an electrocardiogram of the user and converts the read information into a signal. Alternatively, information such as the biometric information and the private key can be managed in a special anti-tampering storage region in place of the TPM 246.

The touch panel 249 includes two functions, a display function and an input function. The touch panel 249 displays information to be provided to the user. When the user presses a screen with the user's finger, the touch panel 249 externally outputs information about the pressed position on the screen as an information signal. The output signal information is used by an application so that the user can operate the application via the touch panel 249.

The short-range communication I/F 250 is an interface that supports a communication method for short-range communication, such as near-field communication (NFC) and Bluetooth®. In the present exemplary embodiment, communication with the MFP 101 is performed via the short-range communication I/F 250.

The clasp sensor 251 is a sensor configured to detect whether the wearable terminal 102 is worn by the user. Once authentication is performed in a state where the wearable terminal 102 is worn by the user, an authenticated state is maintained until the clasp sensor 251 detects removal of the wearable terminal 102 from the user.

The vibration motor 252 vibrates the wearable terminal 102. The vibration provides a notification to the user.

The wearable terminal 102 includes a microphone (not illustrated) and can receive user audio input in place of the touch panel 249.

The information processing apparatus 104 has a configuration similar to a configuration that includes at least the CPU 242, the ROM 244, the storage apparatus 245, the RAM 243, the TPM 246, the biometric information sensor 248, and the short-range communication I/F 250 of the wearable terminal 102. A storage apparatus of the information processing apparatus 104 stores an application program configured to realize cooperation with the wearable terminal 102, and a CPU of the information processing apparatus 104 executes the application program.

Using a function of the application, the information processing apparatus 104 can perform biometric authentication of the user wearing the wearable terminal 102 that is paired in place of the wearable terminal 102. In a case where the authentication is successful, a notification of the authentication state can be transmitted to the wearable terminal 102. In other words, even if the wearable terminal 102 does not have an authentication function, an authentication state of the user wearing the wearable terminal 102 and identification information about the user identified by authentication can be acquired from the information processing apparatus 104.

<Functional Configuration of MFP>

Figure 3A:
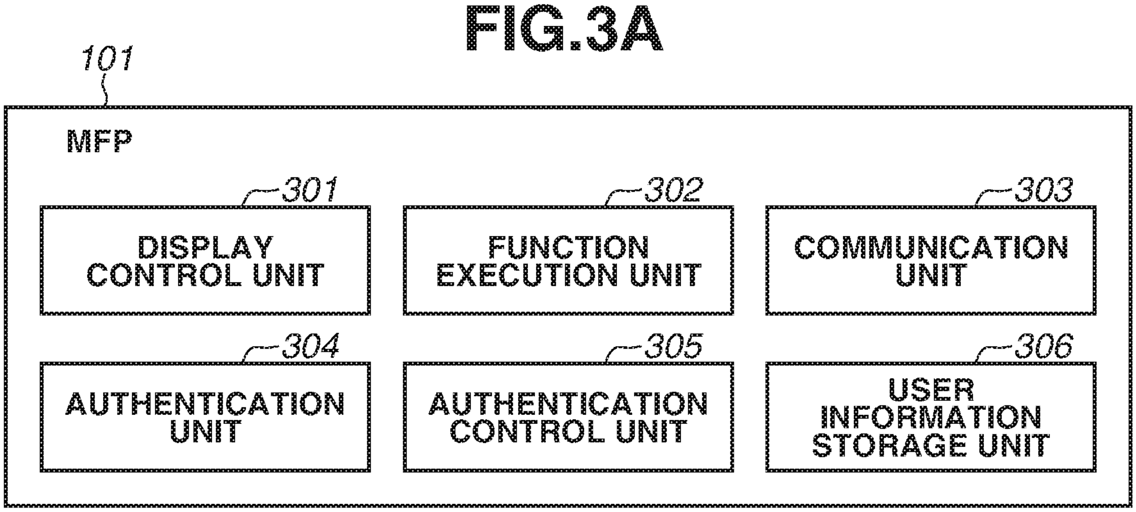
FIG. 3A is a block diagram illustrating an example of a functional configuration of the MFP.

FIG. 3A is a block diagram illustrating an example of a functional configuration of the MFP 101.

In the MFP 101, a display control unit 301, a function execution unit 302, a communication unit 303, an authentication unit 304, an authentication control unit 305, and a user information storage unit 306 operate. The CPU 201 reads one or more programs stored on the ROM 206 or the HDD 207 and executes the read program(s) to thereby realize each unit of the MFP 101.

The display control unit 301 is a software module configured to display a login screen described below and a UI for receiving a wearable terminal registration instruction on the operation unit 209. The function execution unit 302 is a software module configured to execute a function of scanning a document using the scanner 215, a function of transmitting image data using the network I/F 204, and a function of printing image data using the printer 216. The module can be provided for each function. The communication unit 303 is a software module configured to communicate with an external apparatus such as the wearable terminal 102.

The authentication unit 304 is a software module configured to perform user authentication based on input authentication information (password) using an integrated circuit (IC) card. The function execution unit 302 limits and controls each function and acquires information about an address of the authenticated user that is a transmission destination of image data based on a result of authentication by the authentication unit 304.

The authentication control unit 305 is a software module for using an authentication-related function provided by the wearable terminal 102. The authentication control unit 305 can be provided, for example, in the form of a software development kit (SDK) by a company that provides the wearable terminal 102. The authentication control unit 305 cooperates with the authentication unit 304 and realizes control so that the authentication unit 304 skips execution of further authentication processing on the user who is successfully authenticated by the wearable terminal 102.

The user information storage unit 306 is a software module configured to store a user information management table, which will be described below with reference to Table A, and a terminal management table, which will be described below with reference to Table B, on a storage apparatus, such as the HDD 207, and manages the stored tables.

<Functional Configuration of Wearable Terminal>

Figure 3B:
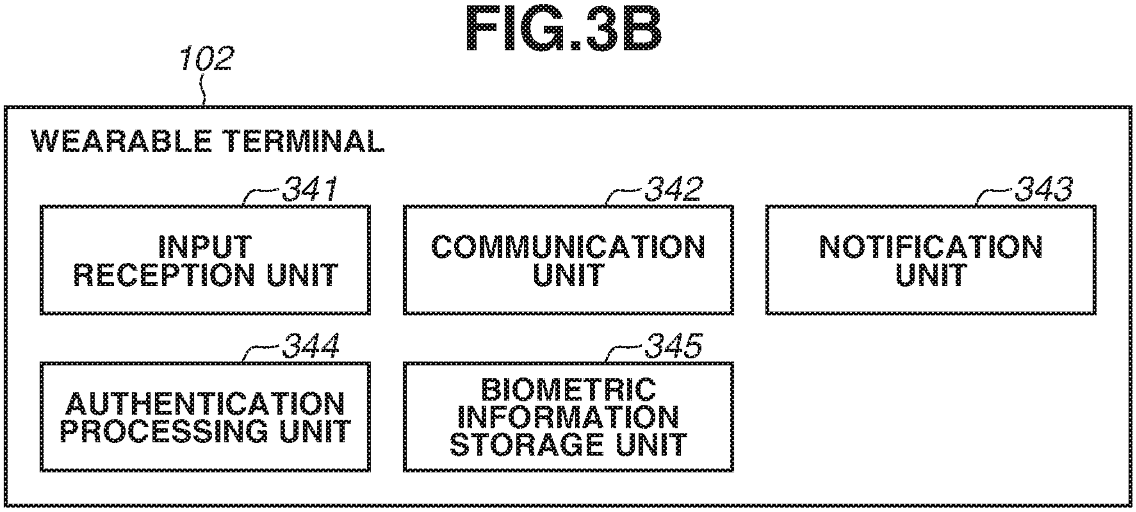
FIG. 3B is a block diagram illustrating an example of a functional configuration of the wearable terminal.

FIG. 3B is a block diagram illustrating an example of a functional configuration of the wearable terminal 102.

In the wearable terminal 102, an input reception unit 341, a communication unit 342, a notification unit 343, an authentication processing unit 344, and a biometric information storage unit 345 operate. The CPU 242 reads one or more programs stored on the ROM 244 or the storage apparatus 245 onto the RAM 243 and executes the read program(s) to thereby realize each unit of the wearable terminal 102.

The input reception unit 341 is a software module configured to receive user input via the touch panel 249 or the microphone (not illustrated). The communication unit 342 is a software module configured to communicate with an external apparatus, such as the wearable terminal 102, and communicates with the wearable terminal 102 via short-range communication, such as Bluetooth® Low Energy. The notification unit 343 is a software module configured to display information to be provided to the user on the touch panel 249 and vibrate the vibration motor 252 to provide a notification to the user.

The authentication processing unit 344 is a software module configured to read biometric information and perform biometric authentication. When the clasp sensor 251 detects removal of the wearable terminal 102 from the user, the authentication processing unit 344 receives a signal of the detection and changes the authentication state to an unauthenticated state. When a request for checking the authentication state is received from the MFP 101, the authentication processing unit 344 returns the authentication state. Even in a case where the information processing apparatus 104 performs authentication processing in place of the wearable terminal 102, the wearable terminal 102 includes the authentication processing unit 344, which manages the authentication state and returns the authentication state to the MFP 101.

The biometric information storage unit 345 is a software module that is a special anti-tampering storage area and manages a biometric information table, which will be described below with reference to Table C, and an authentication information table, which will be described below with reference to Table D.

<Tables Managed by MFP>

Tables A and B are examples of tables that are managed by the user information storage unit 306 of the MFP 101.

TABLE A

| User ID | Password | Email Address |
|---|---|---|
| user001 | ************ | user001@co.jp |
| user004 | ************ | user004@co.jp |
| . . . | . . . | . . . |

Table A is a user information management table. Each record specifies a piece of user information. A user ID column stores identification information (user ID) that uniquely identifies a user of the MFP 101. A password column stores a password for user authentication by the authentication unit 304. An email address column stores an email address that is contact information about the user. Besides the email address, attribute information about the user, such as a file path of a home folder of the user and an address of the user, can be stored on the table.

TABLE B

| Authentication Information ID | Public Key | User ID |
|---|---|---|
| 407c-8841-79d | AC43C5FB-BFA2-48D1-A71B-FB04ACDA347A | user001 |
| 4c04-428b-a7a2 | 8143CA9F-35C9-4333-948F-BFCE66A74310 | user002 |
| . . . | . . . | . . . |

Table B is a terminal management table that manages information about the wearable terminal 102 registered in the MFP 101. Each record specifies a piece of information about the wearable terminal 102. An authentication information ID column stores an ID that uniquely identifies the wearable terminal 102 associated with the MFP 101. As described below with reference to FIG. 4, the authentication information ID is issued by the wearable terminal 102 in response to a registration request from the MFP 101. A public key column stores information about a public key that is a pair with a private key issued by the wearable terminal 102. The private key is stored and managed by the wearable terminal 102. A user ID column stores an user ID of the MFP 101 that is associated with the wearable terminal 102. Each record can contain a terminal ID that is identification information about the wearable terminal 102 corresponding to the record, and the terminal ID can be managed.

<Tables Managed by Wearable Terminal>

Tables C and D are examples of tables that are managed by the biometric information storage unit 345 of the wearable terminal 102.

TABLE C

| Biometric Information ID | Authentication State |
|---|---|
| d493a744 | Authenticated |

Table C is a biometric information table. Each record specifies a single piece of biometric information. A biometric information ID column stores identification information (biometric information ID) corresponding to a feature amount of the biometric information. An authentication state column specifies the authentication state. In a case where the user is authenticated, the authentication state is "authenticated", whereas in a case where the user is not authenticated, the authentication state is "unauthenticated". The authentication state is updated in a case where the authentication processing unit 344 executes authentication processing using the biometric information or in a case where the wearable terminal 102 is removed from the user.

TABLE D

| Authentication Information ID | Application Name | Private Key |
|---|---|---|
| 407c-8841-79d | mfp_app | 1faea2da-a269-4fa7-812a-509470d9a0cb |
| 4c04-428b-a7a2 | pos_app | d7ae30c8-3775-4706-8597-aaf681bc30f5 |
| 92b2-498d-bea6 | med_svc | 36ae5eed-732b-4b05-aa7b-4dddb4be3267 |
| . . . | . . . | . . . |

Table D is an authentication information table. Each record specifies a piece of authentication information. An authentication information ID column stores unique identification information (authentication information ID) for each piece of authentication information. An application name is a name that uniquely identifies an application. The authentication information ID is issued for each application. A private key column stores private keys that are generated in association with respective pieces of authentication information. A public key that is a pair with a private key is generated together with the private key when the private key is generated, and the generated public key is managed by the application specified by the application name and is referenced.

A process of storing the information corresponding to Table D will be described below with reference to FIG. 4.

<Registration of Wearable Terminal>

Registration of the wearable terminal 102 from the MFP 101 will be described below with reference to FIGS. 4, 5A, 5B, and 5C.

Figure 4:
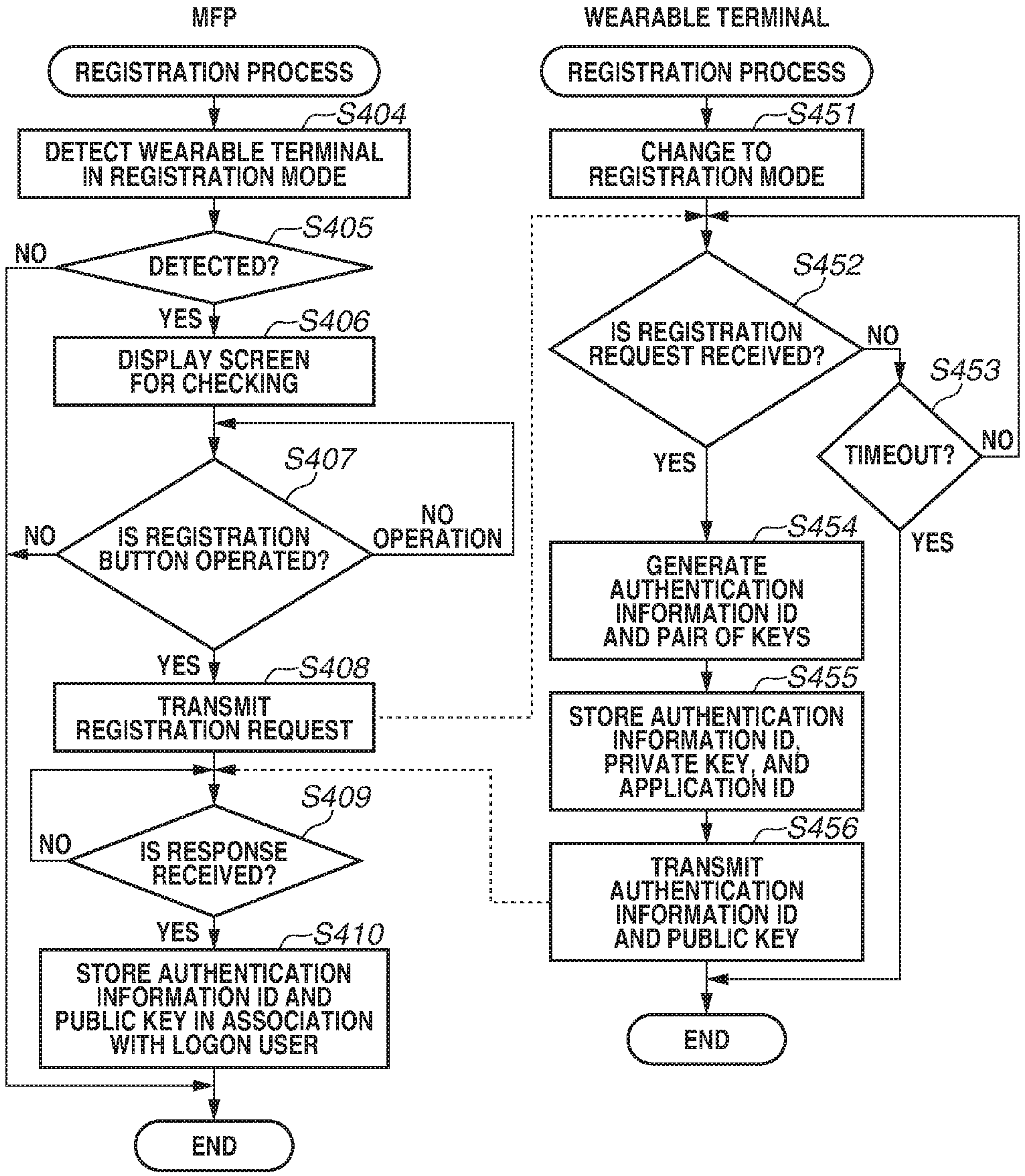
FIG. 4 is a flowchart illustrating a process of registering the wearable terminal to the MFP.
Figure 5A:
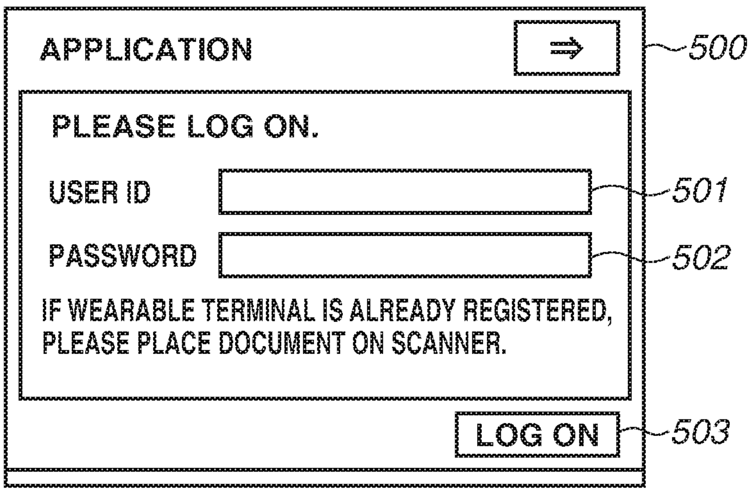
FIGS. 5A, 5B, and 5C are diagrams each illustrating an example of a screen displayed on the MFP.

FIG. 5A illustrates an example of a login screen of the MFP 101. A login screen 500 includes textboxes 501 and 502 and a button 503. The textbox 501 is a textbox configured to receive an input user ID. The textbox 502 is a textbox configured to receive an input password. The button 503 is a button configured to receive a login with the user ID and the password that are input to the respective textboxes. A flowchart illustrated in FIG. 4 describes an example of a process that is started if an operation on the button 503 is detected or an IC card for login touches a card reader.

The authentication unit 304 of the MFP 101 performs login processing using the input user ID and the input password. In the present exemplary embodiment, the information that is input to the textboxes 501 and 502 is used. The authentication unit 304 determines whether to allow the login by checking whether the user ID and the password that are input to the textboxes 501 and 502 are stored on the information stored on the user information management table in Table A. In a case where the login is unsuccessful, a notification (not illustrated) that the login is unsuccessful is displayed on the login screen 500 to prompt the user to reinput information.

The display control unit 301 displays a top screen for a logon user after the user logs in. The top screen will be described below with reference to FIG. 5B.

Figure 5B:
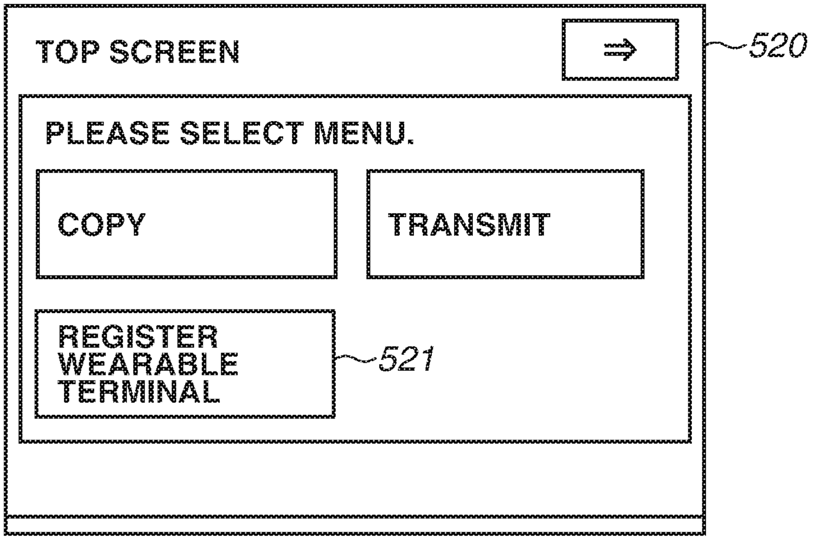

FIG. 5B illustrates an example of the top screen of the MFP 101. A top screen 520 includes a button for executing a function provided by the MFP 101. A button 521 is a button for receiving registration of the wearable terminal 102.

FIG. 4 is a flowchart illustrating processes of registering the wearable terminal 102 that are respectively performed by the MFP 101 and the wearable terminal 102. The processes are started if the MFP 101 detects a user operation on the button 521 on the top screen 520.

Steps S404 to S410 are the process performed by the MFP 101. Steps S451 to S456 are the process performed by the wearable terminal 102. The processes illustrated in FIG. 4 are realized by executing a program for the procedures of the MFP 101 and the wearable terminal 102 in the flowchart.

In step S404, the authentication control unit 305 executes detection processing to detect the wearable terminal 102 that is in a registration mode, and the processing proceeds to step S405.

In step S405, the authentication control unit 305 checks whether the wearable terminal 102 is detected. As described below, the state of the wearable terminal 102 can be changed to the registration mode, and in step S404, only the wearable terminal 102 that is in the registration mode is detected. In a case where the wearable terminal 102 is detected (YES in step S405), the processing proceeds to step S406. In a case where a predefined interval of time passes without detecting the wearable terminal 102 (NO in step S405), the display control unit 301 displays a notification that no wearable terminal is detected, and the process is ended. In the case where the process is ended, the screen is returned to the top screen of the MFP 101 in FIG. 5B.

In step S406, the display control unit 301 displays a screen that prompts the user to check the wearable terminal 102 to be registered, and the processing proceeds to step S407.

Figure 5C:
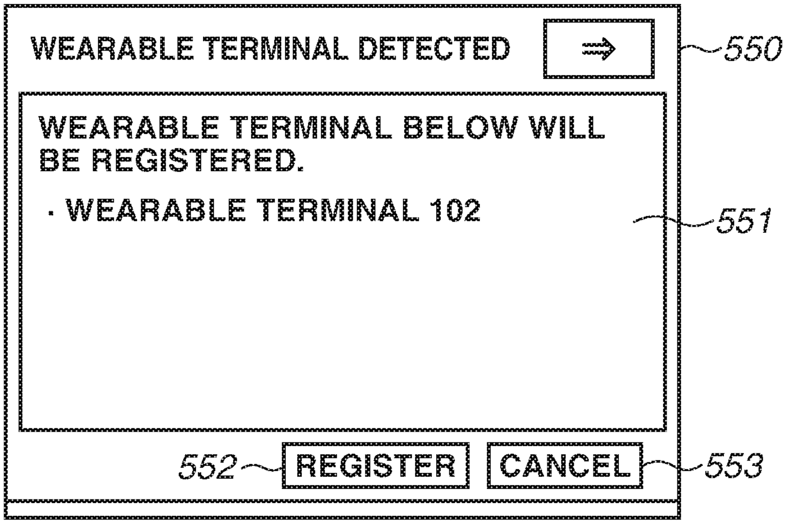

FIG. 5C illustrates an example of a checking screen that is displayed by the display control unit 301 in step S406. A checking screen 550 includes a text display region 551 and buttons 552 and 553. The text display region 551 displays the wearable terminal 102 that is detected in step S404. The button 552 is a button for receiving execution of registration of the wearable terminal 102 that is displayed on the text display region 551. The button 553 is a button for receiving cancellation of registration of the wearable terminal 102. While only one wearable terminal 102 is detected in the example of the checking screen 550, in a case where a plurality of wearable terminals 102 that is in the registration mode is detected, a UI for selection can be displayed.

In step S407, the display control unit 301 continues monitoring until the checking screen 550 is operated. In a case where an operation on the button 552 is detected (YES in step S407), the processing proceeds to step S408. In a case where an operation on the button 553 is detected (NO in step S407), the process is ended.

In step S408, the authentication control unit 305 transmits a registration request to the wearable terminal 102 via the communication unit 303, and the processing proceeds to step S409. The registration request contains an application name.

In step S409, the communication unit 303 monitors whether a response to the registration request transmitted in step S409 is received. In a case where a response is received (YES in step S409), the processing proceeds to step S410. Meanwhile, in a case where no response is received (NO in step S409), the communication unit 303 continues monitoring.

In step S410, the authentication unit 304 stores an authentication information ID and a public key that are contained in the response received via the authentication control unit 305 and the user ID of the user who logs on in step S401 in the terminal management table in Table B, and the process is ended. Then, the registration process by the MFP 101 is ended.

Next, the registration process by the wearable terminal 102 will be described below.

If the input reception unit 341 of the wearable terminal 102 receives a user operation for changing to the registration mode, step S451 is started. An example of an operation for changing to the registration mode is an operation of tapping the touch panel 249 of the wearable terminal 102 a predetermined number of times.

In step S451, the authentication processing unit 344 changes the state to the registration mode for receiving a registration request, and the processing proceeds to step S452. In step S452, the authentication processing unit 344 monitors communication from another apparatus, such as the MFP 101, and checks whether a registration request is received. In a case where a registration request is received (YES in step S452), the processing proceeds to step S454. Meanwhile, in a case where no registration request is received (NO in step S452), the processing proceeds to step S453.

In step S453, the authentication processing unit 344 checks whether a predefined interval of time passes from the change to the registration mode. In a case where the predefined interval of time passes (YES in step S453), a timeout occurs and the registration mode is cancelled, and the process is ended. Meanwhile, in a case where the predefined interval of time does not pass (NO in step S453), the processing returns to step S452, and monitoring of communication is continued.

In step S454, the authentication processing unit 344 generates an authentication information ID and a pair of a private key and a public key, and the processing proceeds to step S455. In step S455, the biometric information storage unit 345 stores the authentication information ID and the private key that are generated in step S454 and the application name contained in the registration request received in step S452 in the authentication information table in Table D, and the processing proceeds to step S456. The authentication information ID and the pair of the private key and the public key can be generated and stored in advance at a timing when authentication processing using the biometric information is successful.

In step S456, the communication unit 342 transmits the authentication information ID and the public key that are generated in step S454 to the MFP 101, and the process is ended.

The registration of the wearable terminal 102 is performed as described above so that the user of the MFP 101 and the wearable terminal 102 are associated.

<Transmission to User Contact Information>

Next, a process of transmitting image data scan by the MFP 101 to a destination specified by contact information about the logon user will be described below with reference to FIGS. 6 to 8.

In the present exemplary embodiment, the process is started if the user wearing the wearable terminal 102 places a document to be scan on the scanner 215 of the MFP 101.

Specifically, in a case where a document is placed on the scanner 215 of the MFP 101, the authentication control unit 305 checks whether there is a wearable terminal within a predetermined distance range (range where the authentication state can be checked) via the communication unit 303. In a case where a wearable terminal is detected in the predetermined distance range, the process illustrated in FIG. 6 is started. In a case where no wearable terminal is detected within the predetermined distance range although a document is placed on the scanner 215, the display control unit 301 can display the login screen 500 containing an error message as illustrated in FIG. 7A.

Figure 6:
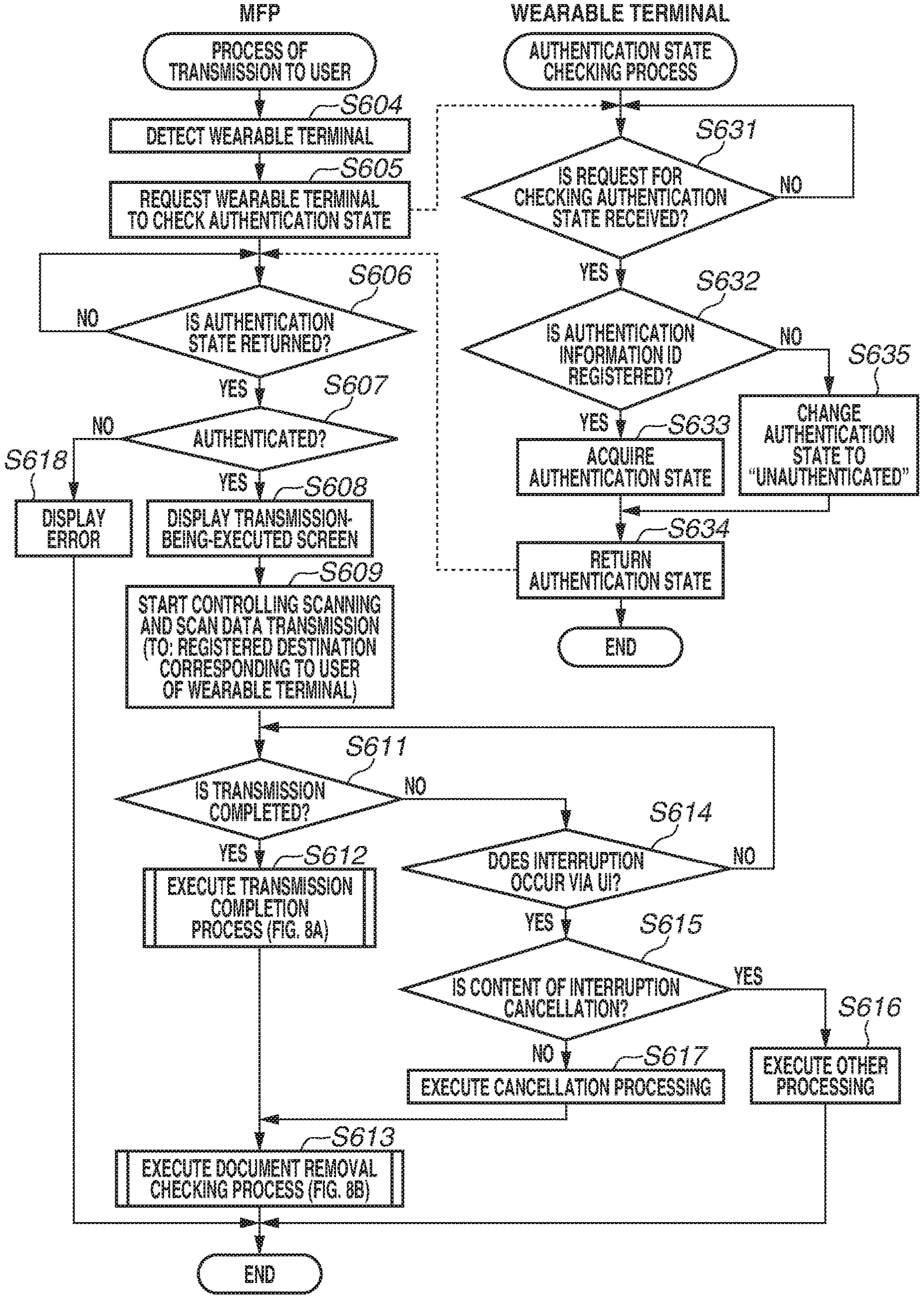
FIG. 6 is a flowchart illustrating a transmission process that is performed by the MFP and the wearable terminal.
Figure 7A:
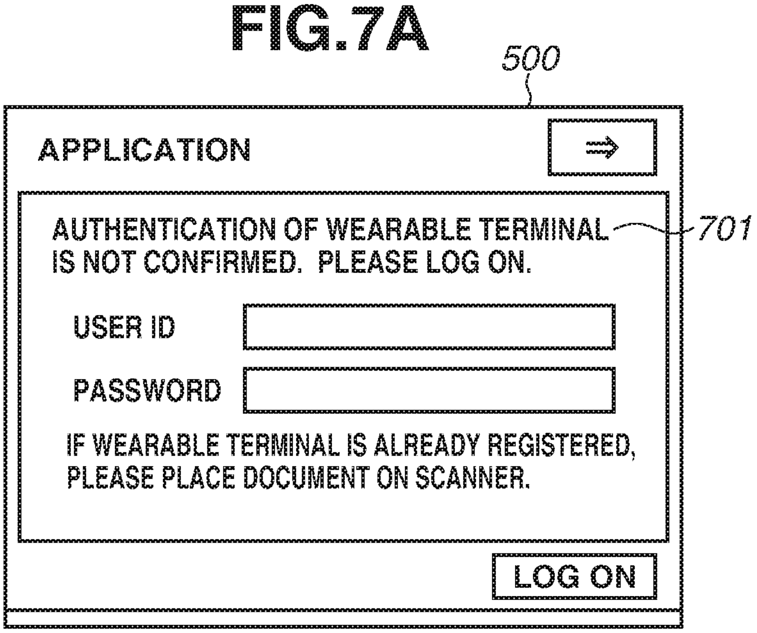
FIGS. 7A and 7B are diagrams illustrating screen examples that relate to the transmission process and is displayed on the MFP.

FIG. 6 is a flowchart illustrating processes of the MFP 101 and the wearable terminal 102 in transmitting scan image data to the destination specified by the contact information about the logon user. Steps S604 to S617 are the process performed by the MFP 101. Steps S631 to S635 are the process performed by the wearable terminal 102. The processes illustrated in FIG. 6 are realized by executing a program for the procedures of the MFP 101 and the wearable terminal 102 in the flowchart.

In step S604, the authentication control unit 305 detects the wearable terminal 102 within the predetermined distance range. In step S605, the authentication control unit 305 transmits a request for checking the authentication state to the wearable terminal 102, and the processing proceeds to step S606. The request for checking is transmitted with an authentication information ID encrypted with a registered public key corresponding to the ID. In the present exemplary embodiment, the authentication state is checked in a case where there is a registered wearable terminal. Alternatively, the authentication state can be checked with the wearable terminal 102 after whether the user wishes execution of authentication is checked based on a gesture of moving the wearable terminal 102 or a tap operation on the touch panel 249 in a case where the range where the authentication state can be checked is wide or in a case where there is a plurality of wearable terminals.

In step S606, the communication unit 303 monitors whether the authentication state is returned from the wearable terminal 102. In a case where data is returned from the wearable terminal 102 and thus the authentication state is acquired (YES in step S606), the processing proceeds to step S607. Meanwhile, in a case where no authentication state is returned (NO in step S606), the monitoring is continued. The data returned from the wearable terminal 102 is decoded with the registered public key. Further, the data returned from the wearable terminal 102 contains identification information about the wearable terminal 102 in addition to the authentication state. The data returned from the wearable terminal 102 can further contain identification information such as the authentication information ID and the user ID of the user wearing the wearable terminal 102.

In step S607, the authentication unit 304 checks the returned authentication state. In a case where the authentication state is "authenticated" (YES in step S607), the processing proceeds to step S608. Meanwhile, in a case where the authentication state is "unauthenticated" (NO in step S607), the processing proceeds to step S618. In step S618, the display control unit 301 displays the login screen 500 containing an error message as illustrated in FIG. 7A. Then, the process is ended.

In step S608, the display control unit 301 controls the screen display, on the operation unit 209 of the MFP 101, indicating that transmission is executed. Alternatively, the display control unit 301 can control the display on the touch panel 249 of the wearable terminal 102 by providing information that indicates that transmission is being executed and information for receiving an interruption processing instruction. The interruption processing will be described below. Further, in step S609, the function execution unit 302 starts controlling document scanning and scan data transmission. In the present exemplary embodiment, the user ID that is registered in association with the wearable terminal 102 detected in step S604 is identified by referring to Table B. Then, the destination information (email address) that corresponds to the user ID is identified by referring to the user information management table in Table A. The identified destination information is automatically set as a scan data transmission destination. Alternatively, the corresponding destination information can be identified using the identification information (terminal ID, authentication information ID, user ID) contained in the data returned from the wearable terminal 102.

Default settings that are managed in advance by the MFP 101 are used as scan and transmission settings (resolution, file format, and the like) other than the destination. As to the settings, favorite settings for each user can be registered in association with the user ID in the MFP 101 or an authentication server on a network, and the registered favorite settings can be used. In this case, the favorite settings are read together with the destination information corresponding to the user ID.

Figure 7B:
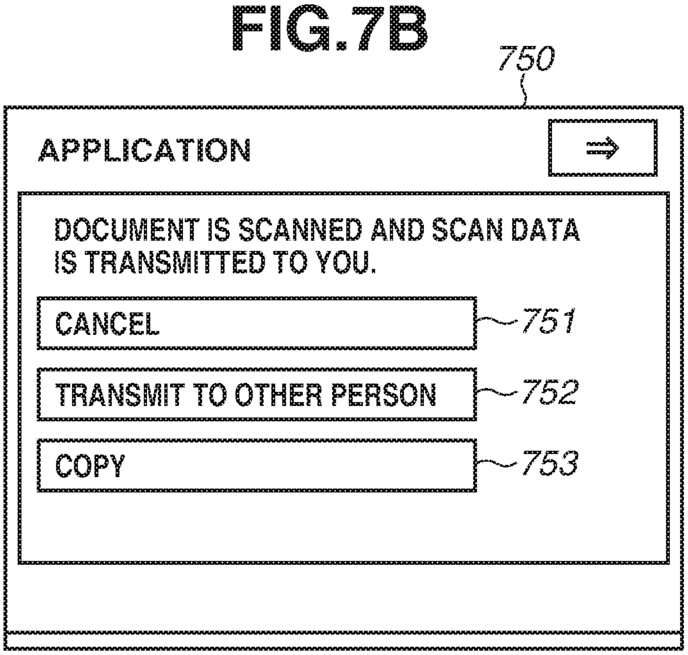

FIG. 7B illustrates an example of a screen that is displayed in step S608 and indicates that transmission is executed. A transmission-being-executed screen 750 contains buttons 751 to 753. The button 751 is a button for receiving an instruction to cancel transmission to a destination specified by the contact information about the user. The button 752 is a button for displaying a setting UI for transmission to another person. The button 753 is a button for displaying a copy processing setting UI for switching to not the scan data transmission but the copy processing.

If one of the buttons 751 to 753 is operated via the transmission-being-executed screen 750, interruption processing occurs, and step S615 is executed. If transmission processing is completed without an operation on the buttons 751 to 753 of the transmission-being-executed screen 750, interruption processing does not occur. In a case where interruption occurs, transmission processing is not started, or if transmission processing is being executed, the transmission processing is stopped (suspended).

In step S611, the display control unit 301 monitors whether the transmission processing in step S609 is completed. In a case where the processing is completed (YES in step S611), the processing proceeds to step S612. Meanwhile, in a case where the processing is not completed (NO in step S611), the processing proceeds to step S614.

Figure 8A:
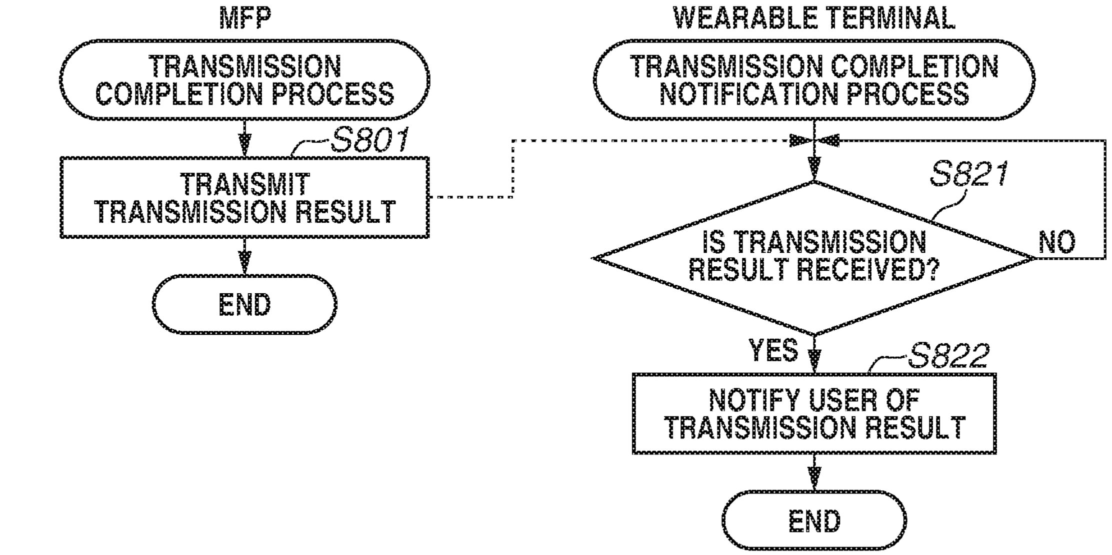
FIGS. 8A and 8B are flowcharts each illustrating an example of a process that is performed by the MFP and a process that is performed by a related wearable terminal after the transmission is completed.

In step S612, a transmission completion process, which will be described below with reference to FIG. 8A, is executed, and the processing proceeds to step S613.

Figure 8B:
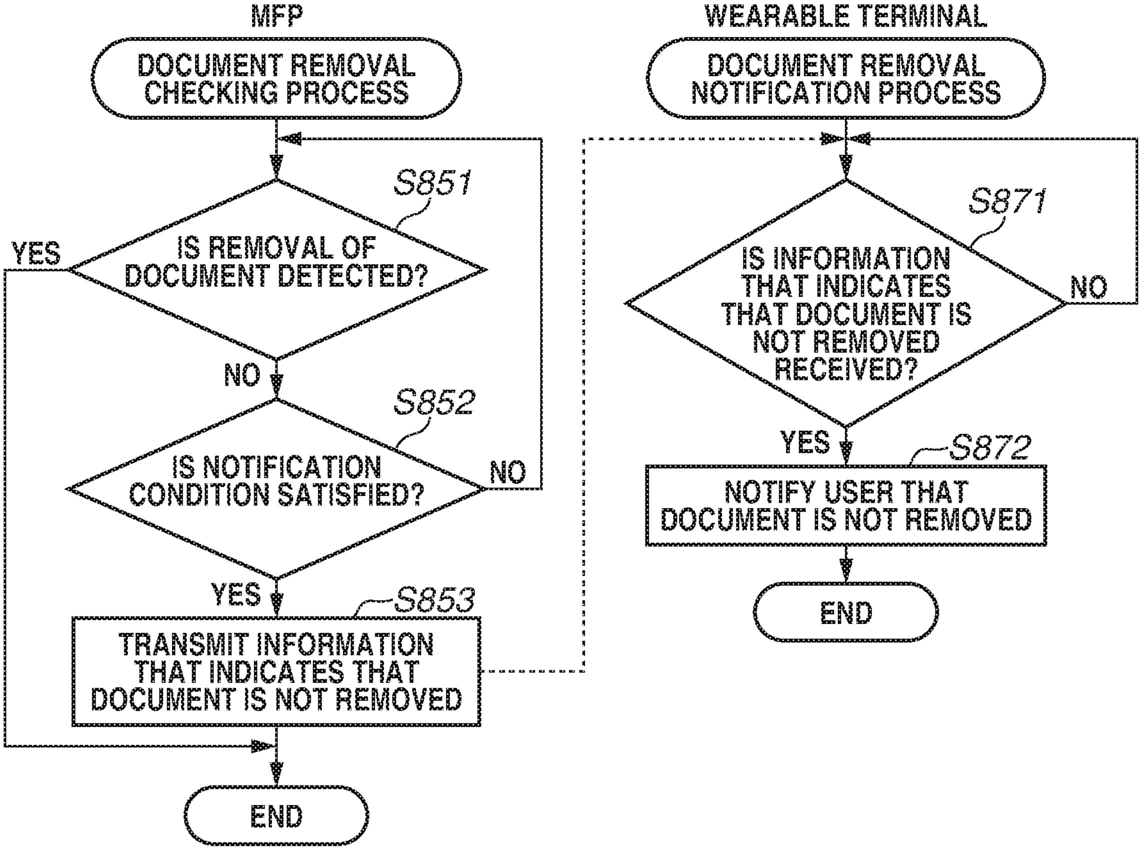

In step S613, a document removal checking process, which will be described below with reference to FIG. 8B, is executed, and the process is ended.

In step S614, the display control unit 301 monitors whether one of the buttons 751 to 753 is operated on the transmission-being-executed screen 750 and interruption occurs. In a case where interruption occurs (YES in step S614), the processing proceeds to step S615. Meanwhile, in a case where interruption does not occur (NO in step S614), the processing returns to step S611, and the monitoring of whether transmission processing is completed is continued. In the process, the display of the transmission-being-executed screen 750 in step S608 by the display control unit 301 and the processing in step S609 by the function execution unit 302 are performed in separate threads. Thus, the determination in step S614 as to whether interruption occurs is asynchronously executed between the start of the processing in step S609 and the completion of the transmission processing.

In step S615, the display control unit 301 checks the content of the interruption processing specified via the transmission-being-executed screen 750. In a case where the content is cancellation of the processing by operating the button 751 (YES in step S615), the processing proceeds to step S616. Meanwhile, in a case where the other button 752 or 753 is operated (NO in step S615), the processing proceeds to step S617.

In step S616, the function execution unit 302 cancels the processing that is being executed, and the process is ended. In a case where the transmission processing is suspended, the transmission processing is cancelled by erasing the transmitted data from a server.

In step S617, the display control unit 301 displays a UI (setting screen) for executing a function that corresponds to the specified processing. In the case where the button 752 is pressed, a UI for a setting for transmission to another person is displayed. In the case where the button 753 is operated, a UI (setting screen) for copying is displayed. After the setting is completed, transmission processing using scan data or copy processing is executed, and if the executed processing is completed, the processing proceeds to step S613.

Next, the process by the wearable terminal 102 will be described below.

In step S631, the communication unit 342 monitors communication from the MFP 101 and checks whether the communication includes a request for checking the authentication state. In a case where a request for checking the authentication state is included (YES in step S631), the processing proceeds to step S632. Meanwhile, in a case where a request for checking the authentication state is not included (NO in step S631), the monitoring of communication details is continued. Data that contains a request for checking is decoded using the private key.

In step S632, the authentication processing unit 344 checks, via the biometric information storage unit 345, whether the authentication information ID contained in the request for checking the authentication state that is received in step S631 is registered in the table in Table D and managed. In a case where the authentication information ID is registered (YES in step S632), the processing proceeds to step S633. Meanwhile, in a case where the authentication information ID is not registered (NO in step S632), it is determined that the registration process described above with reference to FIG. 4 is not performed, and the processing proceeds to step S635.

In step S633, the authentication processing unit 344 acquires the authentication state stored on the biometric information table in Table C via the biometric information storage unit 345, and the processing proceeds to step S634. In step S634, the communication unit 342 transmits data that contains the authentication state to the MFP 101, and the process is ended. The data that contains the authentication state can be encrypted with the private key. Further, the data can contain identification information about the wearable terminal 102, such as the terminal ID and the authentication information ID, as described above.

In step S635, the authentication processing unit 344 changes the authentication state to "unauthenticated", and the processing proceeds to step S634. In this case, the communication unit 342 transmits the authentication state that indicates "unauthenticated" to the MFP 101, and the process is ended.

FIG. 8A illustrates details of the transmission completion process executed in step S612. FIG. 8A illustrates the process that is executed by the MFP 101 and also a process that is accompanied by the process executed by the MFP 101 and is executed by the wearable terminal 102.

In step S801, the communication unit 303 of the MFP 101 transmits a notification of a result that indicates that the transmission processing executed in step S609 using the destination information corresponding to the logon user is completed.

In step S821, the communication unit 342 of the wearable terminal 102 monitors communication from the MFP 101 and checks whether a result of the transmission processing is received. In a case where a result of the transmission processing is received (YES in step S821), the processing proceeds to step S822. Meanwhile, in a case where a result of the transmission processing is not received (NO in step S821), the monitoring of communication details is continued.

In step S822, the notification unit 343 notifies the user of the result of the transmission processing. The notification to the user is performed by displaying a message to be provided on the touch panel 249 or by vibrating the vibration motor 252. The wearable terminal 102 can check that the transmission is completed as described above so that the user can check the result of the transmission processing even in a case where the user is not watching the operation unit 209 of the MFP 101 or the user is a little distance away from the MFP 101.

FIG. 8B illustrates details of the document removal checking process that is executed in step S613. FIG. 8B illustrates not only the process that is executed by the MFP 101 but also a related process that is executed by the wearable terminal 102.

In step S851, the function execution unit 302 of the MFP 101 monitors whether a document is removed. If a document is removed from the scanner 215, the scanner 215 detects the removal of the document, and a signal is transmitted to the function execution unit 302. In a case where removal of a document is detected (YES in step S851), the process is ended. Meanwhile, in a case where removal of a document is not detected (NO in step S851), the processing proceeds to step S852. In step S852, the function execution unit 302 of the MFP 101 determines whether a notification condition is satisfied. The notification condition is, for example, a case where a predetermined interval of time passes without removal of a document from the scanner 215 or a case where the wearable terminal 102 and the MFP 101 are separated by a predetermined distance or longer. In a case where the notification condition is satisfied (YES in step S852), the processing proceeds to step S853. Meanwhile, in a case where the notification condition is not satisfied (NO in step S852), the processing proceeds to step S851.

In step S853, the communication unit 303 of the MFP 101 notifies the wearable terminal 102 that the document is not removed.

In step S871, the communication unit 342 of the wearable terminal 102 monitors communication from the MFP 101 and checks whether a notification that indicates that the document is not removed is received. In a case where a notification that indicates that the document is not removed is received from the MFP 101 (YES in step S871), the processing proceeds to step S872. Meanwhile, in a case where the notification is not received (NO in step S871), the monitoring of communication is continued.

In step S872, the notification unit 343 notifies the user of the possibility that the document is not removed. The notification to the user is performed by displaying a message that indicates the possibility that the document is not removed on the touch panel 249 or by vibrating the vibration motor 252. The wearable terminal 102 provides the notification to the user as described above so that the user recognizes that the document is not removed.

As described above, according to the present exemplary embodiment, once the wearable terminal 102 is registered in the MFP 101, the user wearing the wearable terminal 102 that is authenticated in advance can transmit scan image data to a destination specified by the contact information about the user by simply placing a document on the scanner 215 of the MFP 101 without any other operations.

Further, according to the present exemplary embodiment, the MFP 101 does not execute authentication processing that uses biometric information. In other words, it is unnecessary to register biometric information about each person in a peripheral apparatus that is shared by a plurality of users, so that a feeling of hesitation of the user in registering biometric information for the use of a shared apparatus in an apparatus that does not belong to the user is reduced.

Application Example 1

In the above-described exemplary embodiment, scan image data is transmitted to a destination specified by contact information about the user by simply placing a document on the scanner 215 of the MFP 101 without any other operations. Further, interruption processing can be performed by operating the operation unit 209 of the MFP 101 during a period between a start of scanning and a start of transmission.

An interruption processing instruction can be realized by audio input to a microphone (not illustrated) of the MFP 101 or the touch panel 249 or the microphone (not illustrated) of the wearable terminal 102. The words "cancel" and "copy" are preregistered as input words, and interruption processing is possible by audio analysis.

Application Example 2

In the above-described exemplary embodiment, the scanner 215 of the MFP 101 is described as an example. The present disclosure is also applicable to a peripheral apparatus that provides a function of extracting information from an information medium other than electronic data and converting the extracted information into electronic data. In this case, the converted electronic data is automatically transmitted to a destination that corresponds to the user wearing the wearable terminal 102 as in the above-described exemplary embodiment. An example other than the MFP 101 is a digital camera with a subject being the information medium.

Another specific example of a peripheral apparatus other than the MFP 101 is a digital health device. Specifically, the peripheral apparatus measures health information (blood pressure, body weight, water content, nutritional state) about the user wearing the wearable terminal and converts the measured information into electronic data. Another specific example of a peripheral apparatus other than the MFP 101 is a digital musical instrument. In this case, the peripheral apparatus converts voice produced by the user wearing the wearable terminal or music played by the user into digital data. In the above-described examples, the information medium is the user wearing the wearable terminal or an operation of the user wearing the wearable terminal. In the application examples, the above-described processing in step S613 is skipped.

An apparatus or system and a method thereof configured by combining the above-described exemplary embodiment as appropriate are also encompassed within the scope of the disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-028395, filed Feb. 20, 2019, which is hereby incorporated by reference herein in its entirety.

What is claimed is:

1. A peripheral apparatus configured to generate electronic data from an information medium, the peripheral apparatus comprising:

at least one memory storing instructions; and at least one processor executing the instructions causing the peripheral apparatus to:

acquire data containing information about an authentication state from a wearable terminal within a predetermined range in a case where the acquired data contains information that indicates an authenticated state and an information medium has been detected by the peripheral apparatus, start processing including generating the electronic data using information acquired from the detected information medium and transmitting the generated electronic data to a destination registered in association with a user of the wearable terminal; and provide the wearable terminal with one or more of a notification that the started processing is completed and a notification that the information medium is not removed after the started processing is completed.

2. The peripheral apparatus according to claim 1, wherein execution of the instructions further cause the peripheral apparatus to control a display of a screen that receives an input instruction to interrupt the processing in a case where the processing is started.

3. The peripheral apparatus according to claim 2, wherein the interrupting includes cancelling the started processing.

4. The peripheral apparatus according to claim 2, wherein the interrupting includes transmitting to another destination different from the destination registered in association with the user.

5. The peripheral apparatus according to claim 2, wherein the interrupting includes executing copy processing instead of the started processing.

6. The peripheral apparatus according to claim 1, wherein execution of the instructions further cause the peripheral apparatus to communicate with the wearable terminal on which authentication of the user is performed to register the identification information and the destination corresponding to the user in an associated manner.

7. The peripheral apparatus according to claim 1, wherein the peripheral apparatus generates image data as the electronic data by scanning a document as the detected information medium.

8. The peripheral apparatus according to claim 1, wherein the peripheral apparatus is an image processing apparatus that includes one or more of a scanner, a digital camera, a digital health device, or a digital musical instrument.

9. The peripheral apparatus according to claim 1, wherein the wearable terminal includes a sensor configured to detect biometric information about the user for use in authentication.

10. The peripheral apparatus according to claim 1, wherein the wearable terminal has an authenticator, and the authentication state is a state based on a result of an authentication process by the authenticator.

11. The peripheral apparatus according to claim 1, wherein execution of the instructions further cause the peripheral apparatus to acquire identification information, and wherein the destination of the generated electronic data is registered in association with the user of the wearable terminal based on the identification information.

12. The peripheral apparatus according to claim 11, wherein the identification information is identification information about the wearable terminal.

13. A method by a peripheral apparatus configured to generate electronic data from an information medium, the method comprising:

acquiring data containing information about an authentication state from a wearable terminal within a predetermined range;

in a case where the acquired data contains information that indicates an authenticated state and an information medium has been detected by the peripheral apparatus, starting processing including generating the electronic data using information acquired from the detected information medium and transmitting the generated electronic data to a destination registered in association with a user of the wearable terminal; and providing the wearable terminal with one or more of a notification that the started processing is completed and a notification that the information medium is not removed after the started processing is completed.

14. The method according to claim 13, wherein the method further comprises controlling a display of a screen to receive an input instruction to interrupt the processing on the peripheral apparatus in a case where the processing is started.

15. The method according to claim 13, wherein the method further comprises communicating with the wearable terminal on which authentication of the user is performed to register the identification information and the destination corresponding to the user in an associated manner.

16. A non-transitory computer-readable storage medium having computer executable instructions stored thereon, wherein the instructions cause a computer as a peripheral apparatus to:

acquire data containing information about an authentication state from a wearable terminal within a predetermined range;

in a case where the acquired data contains information that indicates an authenticated state and an information medium has been detected by the peripheral apparatus, start processing including generating the electronic data using information acquired from the detected information medium and transmitting the generated electronic data to a destination registered in association with a user of the wearable terminal; and provide the wearable terminal with one or more of a notification that the started processing is completed and a notification that the information medium is not removed after the started processing is completed.

17. A peripheral apparatus configured to generate electronic data from an information medium, the peripheral apparatus comprising:

at least one memory storing instructions; and at least one processor executing the instructions causing the peripheral apparatus to:

acquire data containing information about an authentication state from a wearable terminal within a predetermined range;

in a case where the acquired data contains information that indicates an authenticated state and an information medium has been detected by the peripheral apparatus, start processing including generating the electronic data using information acquired from the detected information medium and transmitting the generated electronic data to a destination registered in association with a user of the wearable terminal; and control a display of a screen that receives an input instruction to interrupt the processing in a case where the processing is started, wherein the interrupting includes transmitting to another destination different from the destination registered in association with the user or executing copy processing instead of the started processing.

* * * * *